United States Patent [19]

Maerker et al.

[11] 4,252,835
[45] Feb. 24, 1981

[54] EDIBLE AQUEOUS ACID FOOD THICKENER DISPERSION AND PROCESS THEREFOR

[75] Inventors: Karl Maerker, Untereisesheim; Klaus Bezner; Florian Biller, both of Untergruppenback-Unterheimreet; Hans Bohrmann, Talheim, all of Fed. Rep. of Germany

[73] Assignee: CPC International Inc., Englewood Cliffs, N.J.

[21] Appl. No.: 55,718

[22] Filed: Jul. 9, 1979

[30] Foreign Application Priority Data

Jul. 10, 1978 [DE] Fed. Rep. of Germany ....... 2831556

[51] Int. Cl.$^3$ .......................... A23L 1/228; A23L 1/24
[52] U.S. Cl. .................................. 426/589; 426/654; 426/650; 426/638
[58] Field of Search ............... 426/650, 589, 638, 534, 426/535

[56] References Cited

U.S. PATENT DOCUMENTS

| 1,602,958 | 10/1926 | Woo | 426/650 |
|---|---|---|---|
| 2,500,919 | 3/1950 | Cahn | 426/589 |
| 3,563,768 | 2/1971 | Melnick | 426/589 |
| 3,615,600 | 10/1971 | Tonsbeek | 426/435 |

Primary Examiner—Jeanette M. Hunter

[57] ABSTRACT

The present invention is directed to an acidic, aqueous dispersion containing at least one thickener. The dispersion may be used either directly as or as a base for a viscous additive to pastry, storage-stable and nonsegregating food mixtures. It contains at least one edible acid and has a pH from about 2.5 to 6.7. At least one of the thickeners contained in the dispersion consists of amorphous and/or microcrystalline glutamic acid in a concentration of about 6 to 60% by weight, based on the total weight of the dispersion. Methods of preparing and using the dispersion are also disclosed.

5 Claims, No Drawings

EDIBLE AQUEOUS ACID FOOD THICKENER DISPERSION AND PROCESS THEREFOR

BACKGROUND OF THE INVENTION

This invention relates to an acidic, aqueous dispersion containing at least one thickener, which may be used either directly as or as a base for a viscous additive to pasty, storage-stable and nonsegregating food mixture containing apart from water and thickener(s) as well as, optionally, other common components at least one edible acid, further to a process for producing said dispersion and also to the use of said dispersion as a food mixture or in preparing food mixtures, more particularly acid brines or marinades, sauces and salad dressings.

Preparing salad dressings is known to be a relatively troublesome and costly procedure, a challenge to a cook's skills in which many a man or woman has failed, and requires a stock of additives, more particularly (fresh) herbs, which even with modern technical equipment and purchasing facilities frequently is impossible to maintain at least in the normal household.

For this reason there is a great demand for industrially pre-prepared salad dressings and/or concentrates which the food industry has for years been trying to meet without being able to solve the problem in a fully satisfactory way.

This may be explained by the fact that products of this type have to fulfill numerous, in part contradictory, requirements.

Salad sauces or dressings, and/or concentrates thereof which alone can be considered for industrial-scale production, must or should show particularly the following characteristics which are difficult to meet, at least in their entirety. They must or should:

(a) contain at least one edible acid.
(b) contain water-soluble components which are present, at any rate in the finished dressing, at least partially in aqueous solution, as well as water-insoluble components which are solid, more or less fine-grain and, optionally, liquid, more particularly chopped fresh herbal plant parts.
(c) be dilutable and/or miscible with cold water.
(d) be storage-stable and nonsegregating under any commonly existing storage conditions, more particularly when stored in coolers of any type, as well as when occasionally frozen and/or exposed to elevated temperatures of up to 40° C. and more, as may occur in warehouses and during transportation.

To solve these problems a number of different methods have been applied in the past, none of which has proved really successful.

One recommended solution relates to (already) solid, mostly granular mixtures, some of which prove in fact useful in preparing acidic brines and sauerbraten sauces, whereas no products of this type have become known which are (even passably suitable for salad dressings). Apart from other difficulties encountered in connection with this kind of dry products, problems have hitherto been seen notably in the limited choice of dry edible acids capable of imparting sufficient flavor to salad dressings and in the incorporation of fresh herbs.

The solutions known to have been proposed or tried out thus relate essentially to aqueous, more or less viscous, acidic dispersions of the above type, in which choosing a suitable thickener or thickening system presents the main problem.

Essentially two ways are described in the relevant prior art, i.e. thickening with oil emulsions and/or fat emulsions (products made on the basis of mayonnaise, hereinafter briefly referred to as "mayonnaise dressings"), and thickening with edible (carrier) colloid-forming substances or mixtures of substances on the basis of proteins and/or carbohydrates, such as starch modifications, cellulose derivatives and vegetable gums, none of which has hitherto led to a fully satisfactory result.

Mayonnaise dressings, which were the first salad dressings to be produced on an industrial scale and which still make up the majority of salad dressings sold on the market, apart from other disadvantages, are unsatisfactory, particularly because all of them tend to "bleeding", i.e. to giving off oil, in some cases along with an aqueous phase, especially when stored at temperatures not virtually constant, and because the oil and/or fat they contain saponifies and rancidifies quickly in the (prevailing) acid medium, especially under access of air (which is virtually unavoidable). Problems are encountered also when diluting with water, other problems are posed by the inevitably high fat content and by the fact that low calorie salad dressings cannot be prepared from them and that an addition of electrolytes for subsequent seasoning frequently leads to sudden segregation because the emulsion breaks.

The shortcomings of the ready-to-serve salad dressings with carrier colloid thickeners, while being of a different kind, are by no means less serious.

Their main disadvantage may be seen in the fact that in spite of a large number of tests no colloid(al) carrier substance or mixture of such substances on the basis of protein and/or carbohydrates has so far been found which may be used in food without hesitation, ensures a sufficient degree of nonsegregation at all temperatures commonly applied for the purpose and does not gel irreversibly when stored under normal conditions, especially in case of incidental undercooling. This combination of characteristics, in spite of assertions to the contrary, is not achieved even with the most complicated thickener mixes described in prior art (OSes 23 11 403 and 27 53 443).

SUMMARY OF THE INVENTION

The purpose of this invention, therefore, is to provide acidic, aqueous dispersons of the above type which avoid the disadvantages described in prior art and in particular do not show the shortcomings of the known dressings and/or dressing concentrates made on the basis of mayonnaise nor of the products thickened with protein- and/or carbohydrate-based colloids.

This purpose is met starting out from the surprising finding that aqueous, acidic dispersions of amorphous and/or very microcrystalline glutamic acid, whose content of solid glutamic acid is in the range of about 6 to 60% by weight, in a pH range of about 2.5 to 6.7 adjusted to the intended use with one or several edible acid(s) are base mixtures ideally suited to the purpose in question.

The object of this invention therefore is a dispersion of the above type which is characterized in that it features a pH-value of about 2.5 to 6.7 adjusted with an edible acid, more particularly acetic and/or citric acid, and that at least part of the thickener(s) therein contained consists of amorphous and/or microcrystalline glutamic acid, with the proviso that the content of amorphous and/or microcrystalline glutamic acid is about 6 to 60% by weight, based on the total weight of the dispersion.

DETAILED DESCRIPTION OF THE INVENTION

It is known that acidic, aqueous slurries of amorphous and/or microcrystalline glutamic acid with a pH value and glutamic acid content similar to those of dispersions made according to this invention sometimes accumulate by accident in the manufacture of crystalline glutamic acid by crystallizing from an aqueous solution acidified with a mineral acid, as a rule chloric acid (so-called "glutamic acid curd"), a fact which can however not call in question the patentability of the teaching of this invention especially as, on the one hand, the dispersions according to this invention differ clearly from the known mineral acid-based glutamic acid curd in that they are acidified with at least one edible acid, and as, on the other hand, the known glutamic acid curd generally is regarded in prior art as an undesired waste product which can be used only after redissolving and recrystallizing.

It is further noted that when acidic dressings are prepared at home it is frequent practice to add glutamates as so-called flavor enhancers. Occasionally, under such circumstances, glutamic acid is precipitated by accident. The amounts precipitated, however, are so slight that they do not result in a thickening effect of the kind desired and achieved according to this invention.

The pH value of the dispersions of this invention is preferably selected within a range of about 3 to 6.3, more preferably 3.8 to 6.0, and in particular about 4.1 to 5.6.

The glutamic acid content of the dispersions of this invention should preferably be within a range of about 6.5 to 50, more preferably 7.5 to 41.5 and in particular 8 to 38% by weight, the optimum range depending in each specific case on the desired texture, the possible presence of other bodying components and in particular the intended use, i.e. principally on whether the dispersion is to be used as a base mixture in which other thickening and/or diluting (optional) components are to be incorporated, or as a concentrate which before use is diluted, for instance, with water, or as a ready-to-serve dressing which is used undiluted.

It is noted that when selecting the content of glutamic acid it should be observed that the thickening effect of a specific amount of glutamic acid as a rule decreases as the pH value rises, and vice versa, and so with pH values ranging between about 4 and 5.5 the glutamic acid content of the dispersions of this invention should preferably range between about 12 and 40, more preferably between about 14 and 38, and in particular between about 15 and 30% by weight, based always on the total weight of the essential components, i.e. the edible acid and, optionally, salts thereof, water and glutamic acid. On the other hand, in the case of pH values from 5.5, and in particular from about 5.7 upward, it is recommended, using the same basis of reference, to select glutamic acid contents of at least about 28, preferably at least 32, and in particular at least 34% by weight, it being advisable not to exceed a glutamic acid content of 52, preferably 47 and in particular about 42% by weight.

In a preferred embodiment of the invention, one or several optional components are incorporated in the dispersions according to the invention in addition to amorphous and/or microcrystalline glutamic acid, which optional components, possibly beside other characteristics, e.g. seasoning properties, desired to be featured by such products, have a bodying effect. Examples of such optional components are salt, sugars, maltooligo- and/or maltopolysaccharides, vegetable, fruit and/or non-fat milk solids, powdered spices and/or solid, fine-grain and/or sollike proteins of animal and/or vegetable origin.

The glutamic acid content of the dispersion may thus advantageously be limited to at most about 25, preferably at most 20, and in particular at most 15% by weight, based on the total weight of the dispersion. However, also in this embodiment of the invention it should preferably be at least 7, more preferably at least about 9, and in particular at least about 10% by weight.

It is a particular advantage of the dispersions according to this invention that virtually all flavoring components derived from plants or plant parts, such as herbs, onions and garlic, as well as all kinds of vegetables, in particular peppers, tomatoes, celeriac and leek, not only in fine-grain form, but also in the form of relatively large pieces, may be incorporated without sedimenting even after long storage. A particularly important point in this context is that fresh products may be used without any risk of such products perishing rapidly.

The dispersions of this invention may be produced in different ways. One possibility is to grind glutamic acid, optionally in the presence of minor amounts of water, in a colloid mill into a microcrystalline powder, then to mix with water and an edible acid and, optionally, one or several optional component(s), and homogenize.

A simpler and safer way is to produce the amorphous and/or microcrystalline glutamic acid in situ by precipitating with the edible acid(s) in the presence of water from a glutamate which is water-soluble at least to a limited extent.

Although both components of the reaction may be present in the form of solutions, it is recommended to use the glutamic acid in the form of a powder which is as fine-grain as possible, and the edible acid(s) in the form of an aqueous solution. While this embodiment of the invention generally provides placing the glutamate powder in the mixer and then incrementally mixing it with the edible acid solution, it is much safer and also simpler to place the edible acid solution in the mixer first, then add the glutamate powder and disperse it in the solution as quickly and homogeneously as possible.

If in addition to the essential components it is intended to incorporate in the dispersion one or several optional component(s), this may in principal be done at any desired point of the production process, but it has been found to be particularly suitable to prepare a premix of the edible acid(s), the water and, at least, the soluble and/or fine-grain and/or bodying optional components, in which the glutamate is then dispersed until the desired texture is achieved. While or after this is done it is possible to incorporate one or several further optional component(s), in particular components with little resistance to shearing, also more water and/or edible acid(s).

It is noted in this context that for the purposes of the invention it is possible in principle to use also powdered, practically anhydrous mixtures containing as necessary components at least one glutamate and at least one solid edible acid, e.g. citric and/or tartaric acid, in appropriate quantity relations which when considering transportation cost are of course even of advantage, but which at the same time show the shortcomings typical of all powdered dry products and, in addition, require a certain amount of care when being mixed or premixed with water, which as a rule is applied only by industrial confectioners and, at most, large users.

The following example illustrates a particularly preferred embodiment of the invention.

EXAMPLE I

A 15% vinegar (made from an 11.3% vinegar and an 80% vinegar essence) is placed in an Eirich mixer and homogeneously mixed with mustard and a pasty premix of garlic and common salt (50:50). Another premix of salt, castor sugar, malto-dextrin, Aromat and IG is added to the running mixer and stirred in. A premix is thus obtained to which dustlike sodium glutamate is slowly added in an amount equivalent to 10% by weight, based on the total weight of the finished mixture, and is quickly dispersed in it homogeneously, whereupon amorphous and/or microcrystalline glutamic acid precipitates after a short time and the mixture thickens to a semi-liquid salad dressing.

EXAMPLE II

This example illustrates the variations of pH and glutamic acid content possible in the practice of the invention, and the differences in consistency obtainable by varying same. The consistency designations are given according to the following scale: solid, pasty, creamy, salvelike, oily.

A number of dispersions were prepared in the following manner.

First an acetic acid premix, having an acetic acid content of about 17% by weight, was prepared by mixing together 211.5 grams vinegar (containing about 10% acetic acid, 90% water) and 60.5 grams glacial acetic acid (containing about 96% acid, 4% water), resulting in 272 grams premix containing about 79 grams acetic acid and 193 grams water.

Aliquots of the premix were placed in an Eirich mixer, and monosodium glutamate (MSG) was added and homogeneously mixed with the premix. Water was added to some of the dispersions. The consistency of each dispersion was then noted, in accordance with the scale mentioned previously.

The table sets forth the amount of ingredients employed and the pH's and consistencies of the dispersions.

TABLE

| Dispersion No. | Acetic acid premix | MSG, | Water, | pH | Consistency (remarks) |
|---|---|---|---|---|---|
| | gms. | gms. | gms. | | |
| 1 | 272 | 50 | 0 | 4.1 | liquid separates |
| 2 | 272 | 70 | 0 | 4.4 | creamy |
| 3 | 272 | 100 | 0 | 4.7 | salve-like to pasty |
| 4 | 272 | 187 | 0 | 5.5 | pasty |
| 5 | 272 | 222 | 0 | — | solid, unstirrable |
| 6 | 272 | 222 | 100 | — | salve-like to oily |
| 7 | 272 | 300 | 150 | — | oily |
| 8 | 272 | 400 | 400 | 5.75 | oily |
| 9 | 272 | 600 | 600 | 6.0 | oily |
| 10 | 272 | 800 | 700 | 6.2 | oily |
| 11 | 136 | 800 | 500 | 6.2 | liquid separates |

Because dispersions 1 and 11 separated upon standing they were not per se useful as salad dressings or the like. They could, however, be advantageously employed as bases for food products in conjunction with at least one additional bodying component, in which case no undesirable separation took place.

A comparison of dispersions 5 and 6 illustrates the fact that the consistency may be varied as desired by the addition of an appropriate amount of water.

What is claimed is:

1. An additive used as a thickener for foods comprising an aqueous dispersion having:
   (a) from about 6 to 60 percent by weight of solid glutamic acid selected from the group consisting of amorphous and microcystalline glutamic acid; and
   (b) a sufficient quantity of an acid selected from the group consisting of acetic acid and citric acid to adjust the pH of said dispersion to from about 2.5 to 6.7.

2. The additive of claim 1 wherein the pH is from about 4.1 to 5.6.

3. The additive of one of claims 1 or 2 wherein the solid glutamic acid is present in an amount from about 8 to 38 percent by weight.

4. The additive of one of claims 1 or 2, further comprising at least one component selected from the group consisting of salt, sugar, maltooligosaccharides, maltopolysaccharides, vegetable solids, fruit solids, non-fat milk solids, powdered spices, vegetable proteins and animal proteins, wherein the glutamic acid is present in an amount from about 7 to about 25 percent by weight.

5. The additive of claim 3, further comprising at least one component selected from the group consisting of fresh herbs, fresh onions and garlic cloves.

* * * * *

UNITED STATES PATENT AND TRADEMARK OFFICE
CERTIFICATE OF CORRECTION

PATENT NO. : 4,252,835

DATED : February 24, 1981

INVENTOR(S) : Karl Maerker, Klaus Bezner, Florian Biller and Hans Bohrmann

It is certified that error appears in the above-identified patent and that said Letters Patent are hereby corrected as shown below:

On the title page, "[30] Foreign Application Priority Data, Jul. 10, 1978 [DE] Fed. Rep. of Germany .....2831556" should read --[30] Foreign Application Priority Data, July 18, 1978 [DE] Fed. Rep. of Germany .....2831556--.

Title page, under [57] ABSTRACT, Line 3, after "directly" delete "as".

Column 1, line 8, after "directly" delete "as".

Column 4, line 9, "sollike" should read --soylike--.

Signed and Sealed this

Twenty-first Day of July 1981

[SEAL]

Attest:

GERALD J. MOSSINGHOFF

Attesting Officer

Commissioner of Patents and Trademarks